United States Patent [19]

Onitsuka et al.

[11] Patent Number: 4,560,186
[45] Date of Patent: Dec. 24, 1985

[54] CONNECTING PIN CONFIGURATION

[75] Inventors: Masaaki Onitsuka; Kazuyuki Fujiwara, both of Toyota, Japan

[73] Assignee: Toyota Jidosha Kabushiki Kaisha, Toyota, Japan

[21] Appl. No.: 500,001

[22] Filed: Jun. 1, 1983

[30] Foreign Application Priority Data

Mar. 2, 1983 [JP] Japan .................. 58-028947[U]

[51] Int. Cl.$^4$ .................................... B60R 21/00
[52] U.S. Cl. .................................... 280/752; 180/90; 24/297
[58] Field of Search .................. 280/752; 180/90; 296/70, 72; 24/292, 297

[56] References Cited

U.S. PATENT DOCUMENTS

| | | | |
|---|---|---|---|
| 2,590,264 | 3/1952 | Meyers et al. | 24/297 |
| 2,741,324 | 4/1956 | Anderson | 180/90 |
| 2,745,620 | 5/1956 | Murphy | 24/297 |
| 3,040,401 | 6/1962 | Von Rath | 24/297 |
| 4,312,614 | 1/1982 | Palmer et al. | 24/297 |

FOREIGN PATENT DOCUMENTS

| | | | |
|---|---|---|---|
| 1220673 | 7/1966 | Fed. Rep. of Germany | 24/297 |
| 1388010 | 12/1964 | France | 180/90 |
| 50833 | 5/1981 | Japan | 180/90 |
| 157631 | 12/1981 | Japan | 180/90 |

*Primary Examiner*—Joseph F. Peters, Jr.
*Assistant Examiner*—Ross Weaver
*Attorney, Agent, or Firm*—Oblon, Fisher, Spivak, McClelland & Maier

[57] ABSTRACT

A connecting pin with a cross-section comprising vertical and horizontal wing portions. For better connection, opposite surfaces of the pin are changed to form projections. Due to this configuration, the pin can connect two articles with a certain play in one or more directions. The pin can be formed integrally with one of the articles.

11 Claims, 7 Drawing Figures

CONNECTING PIN CONFIGURATION

BACKGROUND OF THE INVENTION

1. Field of the Invention

The present invention relates to a connecting pin for connecting one article to another, for example, for connecting an instrument panel to an automobile body.

2. Description of the Prior Art

Pins are ordinarily formed with a circular cross-section. In general, such circular cross-sectional pins are adapted to connect two articles together in a fixed relationship. In some cases, however, it is desirable to connect two articles with a certain play in one or more directions. For example, this is true when pins are used together with bolts to connect one relatively large article to another. In such cases, the pins are inserted first, and the assembly is bolted together later. The bolts, of course, must be able to be passed through holes at that time. Conventional circular pins are not adapted for such use.

When connecting one article to another by means of pins, in most cases, pins are first rigidly secured to one article at one end, then are connected to the other article at the other ends. The first ends of pins are usually secured to an article by driving the pins into bosses provided in the article. This pin-driving work, however, sometimes results in pin damage and, if at all possible, should desirably be eliminated.

Toward this end, it is desirable to form pins integrally with articles. Such pins, however, project from articles and require what is called in the molding art an "undercut" configuration for anchoring to other articles. This necessitates numerous split dies.

SUMMARY OF THE INVENTION

It is an object of the present invention to provide a connecting pin which allow a certain play in one or more directions after connecting two articles and which is preferably adapted to be formed integrally with an article to be connected.

According to the present invention, there is provided a connecting pin which is adapted to be rigidly secured to one article at one end and to be connected to another at the other end. The pin comprises, in its cross-section, vertical wing portions and horizontal wing portions. A means is provided on at least one of the outer surfaces of one of the vertical and horizontal wing portions, by the change of the surface profile of the outer surfaces, for securing the pin to the other article.

BRIEF DESCRIPTION OF THE DRAWINGS

The invention will now be described in more detail with reference to a preferred embodiment in connection with the attached drawings, in which.

DESCRIPTION OF THE PREFERRED EMBODIMENT

Figure 1:
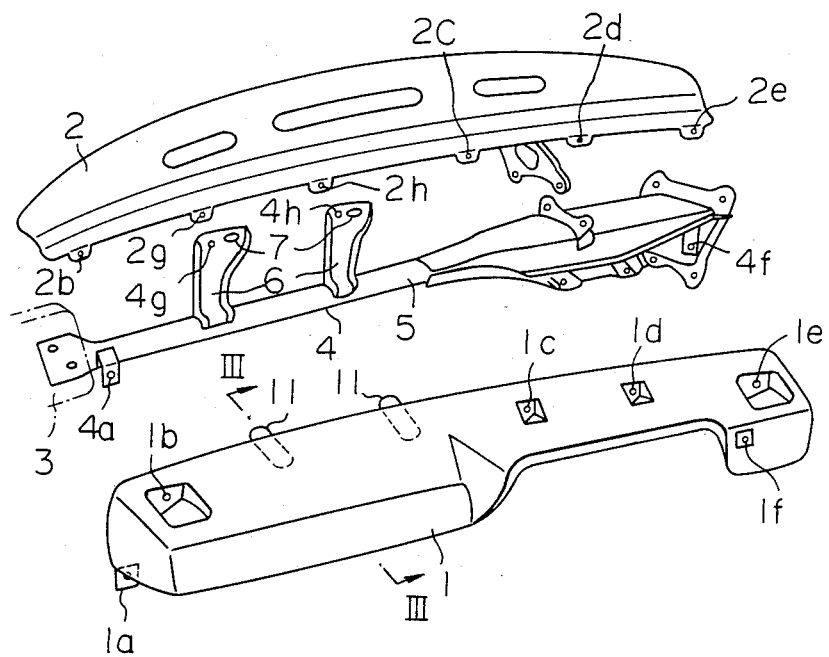
FIG. 1 is an exploded perspective view of an instrument panel assembly of an automobile, according to an embodiment of the invention.

Referring first to FIG. 1, an instrument panel assembly of an automobile is shown in an exploded perspective manner. Reference number 1 generally indicates an instrument panel safety pad, and reference number 2 generally indicates a cowl panel. The visible surface of the safety pad 1 is exposed to the cabin space and is sloped from an upper edge to a lower edge. The safety pad 1 and the cowl panel 2 are attached to a reinforcement 4 which extends traversely between pillars 3 (only left side one shown) of the automobile body. The reinforcement 4 comprises a reinforcement pipe 5 and stays 6 welded to the pipe 5. For the purpose of attaching the safety pad 1 and the cowl panel 2 to the reinforcement 4 by means of bolts (not shown), holes are provided. The safety pad 1 has holes 1a to 1f, the cowl panel 2 has holes 2b to 2e, 2g, and 2h, and the reinforcement 4 has holes 4a and 4f to 4h. The bolts are passed through holes having the same letter.

Figure 2:
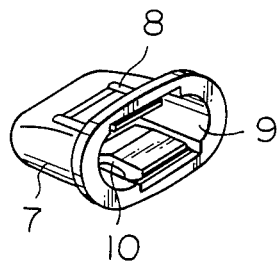
FIG. 2 is an enlarged perspective view of the clip of FIG. 1.

The stays 6 of the reinforcement 4 have slots in addition to holes 4g or 4h to receive clips 7, one of which is shown in greater detail in FIG. 2. The clips 7 have clip members 8 on their outer surfaces. The clips 7 are inserted in the slots of the stays 6 and clipped thereto by those members 8. The clips 7 also have recesses 9 on whose inner surfaces are provided clip members 10 (see also FIG. 6). The clip members 8 and 10 can be integral portions of the clip 7 wall separated by a partially surrounding slot. Two pins 11 are rigidly secured to the safety pad 1 on the sloped back surface at the upper positions, directed toward the recesses 9 of the clips 7 attached to the stays 6.

Figure 3:
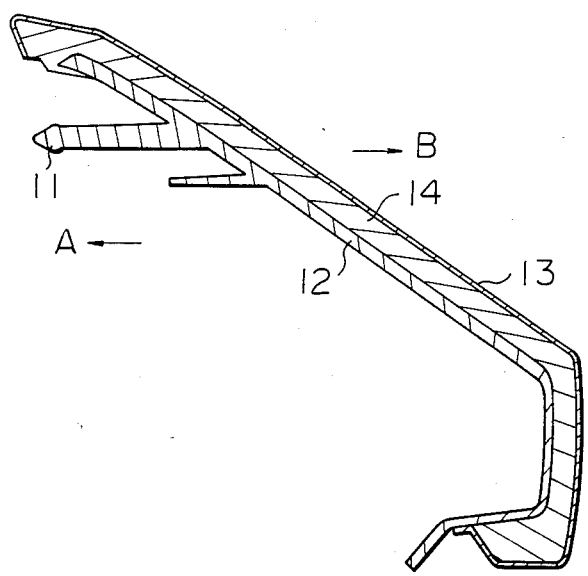
FIG. 3 is a sectional view of the safety pad, taken along the line III—III in FIG. 1.

Referring to FIG. 3, the safety pad 1 comprises safety pad base 12, an optional safety cover 13 over the base 12, and a cushion 14 disposed between the base 12 and the cover 13.

Figure 4:
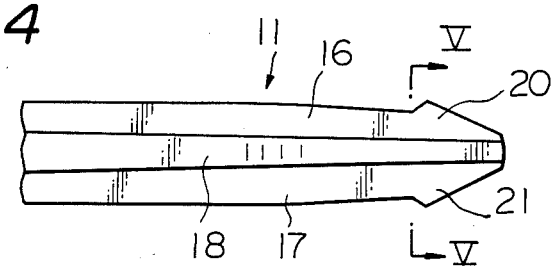
FIG. 4 is a side elevation of the pin of FIG. 1 in an enlarged scale.
Figure 5:
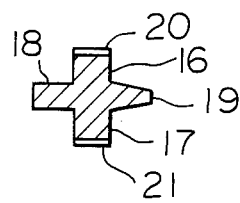
FIG. 5 is a section of the pin, taken along the line V—V in FIG. 4.

Referring to FIGS. 4 and 5, each pin 11 has a generally cross-like cross-section comprising vertical wing portions 16 and 17 and horizontal wing portions 18 and 19. The horizontal wing portion 18 has a generally rectangular cross-section and becomes thinner and narrower, as shown in FIG. 4, in the axial direction toward the pin end. The horizontal wing portion 19 has a trapezoidal cross-section narrower toward the outer end thereof, as shown in FIG. 5. The vertical wing portions 16 and 17 are parallel to each other and generally plane in the outer ends of their cross-sections and become suddenly wider and then suddenly narrower in the axial direction near the pin end so as to form projections 20 and 21.

Figure 6:
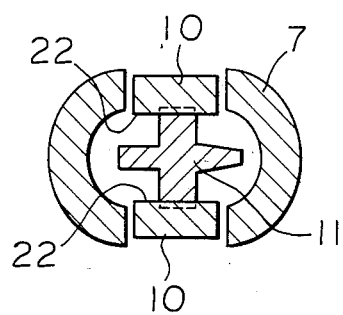
FIG. 6 is a section of the pin in the engaged condition with the clip.

Referring to FIG. 6, a section of the pin 11 as inserted in the clip 7 is shown. The section corresponds to the line V—V of FIG. 4. The inside clip members 10 are spaced opposite to each other and project inward (see FIG. 2). The section shown in FIG. 6 is the innermost projecting area, with which the neck of the projection 20 and 21 engages. The clip members 10 are elastic due to the characteristics of their material, so the projections 20 and 21 of the pin 11 can easily pass through the innermost projecting area of the clip for anchoring.

It is to be understood that this pin-and-clip connection allows the pin to move in the horizontal direction, but not in the vertical direction or in the direction of the pin axis. This pin configuration allows the clips 7 to be of a simple design. It is also advantageous in that the instrument panel assembly work can be smoothly and steadily completed using a pin connection and bolt connection.

Figure 7:
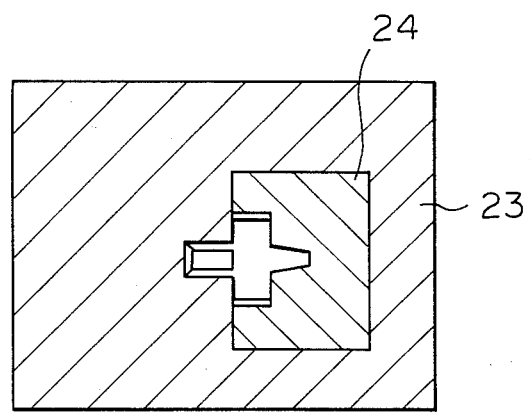
FIG. 7 is a view illustrating a die for molding the pin and the safety pad.

A further advantage of the present invention is that the pins 11 can be formed integrally with the safety pad base 12 by molding, as hatched in FIG. 3. This is because the pin configuration according to the present invention does not require any difficult die designs. In other words, the two opposing die halves can be moved in the directions shown by the arrows A and B in FIG. 3 to remove the integrally formed pins and pad at the last stage of the molding process. To deal with the "undercut" of the projection of the pins, only one minor die 24 is necessary in addition to the major dies 23, as shown in FIG. 7. The major dies 23 can be moved in the pin axis direction, which is perpendicular to the sheet of FIG. 7, i.e., the direction A of FIG. 3. The third die 24 can be moved to the right in FIG. 7. The advantage of forming the pins integrally with the safety pad is clear from the foregoing description.

A still further advantage of the pin configuration, i.e., the generally cross-like cross-section, resides in the saving of material with no significant decrease in strength.

While the invention has been described in connection with an instrument panel assembly, it is not intended to be restricted in such an application. The pin configuration according to the invention can be widely applied for other uses without departing from the spirit and the scope of the invention.

We claim:

1. An instrument panel assembly of an automobile, comprising:
   an instrument panel safety pad extending generally transversely in an automobile cabin and having a first surface exposed to the cabin space and a second surface opposite to said first surface, said safety pad having at least one pin projecting from said second surface, each said at least one pin comprising, in cross-section, vertical wing portions and horizontal wing portions;
   a cowl panel extending generally parallel to said safety pad at a front side of said safety pad;
   a transversing reinforcement on an automobile body including at least one stay to receive said cowl panel; and
   at least one clip means inserted in an opening provided in said at least one stay to receive said at least one pin for securing said safety pad to the automobile body, each said at least one clip means having a wall defining an oblong recess for inserting each said at least pin, two spaced parallel clip members being arranged inside of said wall, said vertical wing portions engaging with said clip members and having projections on their outer surfaces adjacent to the end thereof, the distance between the outer surfaces of said horizontal wing portion of said pin being smaller than that of the recess defining wall in the oblong direction so that said pin can move in the clip means in the clip member extending direction within the limit determined by the above dimensions after the pin is inserted in the clip means.

2. An instrument panel assembly according to claim 1, wherein at least one of said horizontal wing portions of said pin becomes narrower toward a lateral outer end thereof.

3. An instrument panel assembly according to claim 2, wherein said safety pad comprises a base smoothly sloping from an upper edge to a lower edge, said at least one pin being located on a back surface of said base, said back surface corresponding to an upper portion of said second surface, a cover on said base over a surface opposite to said back surface, and a cushion between said base and said cover.

4. A connecting pin which is rigidly secured to and extends generally straight from one article, said pin having a center axis, a free end and a length, said pin being generally configured as a cross in section substantially through the length thereof to said free end in such a manner that said cross comprises a first pair of axially extending wing portions on opposite sides of said center axis, said wing portions having respective opposite surfaces remote from the center axis extending parallel to each other, said wings having a radially outward projection on each of said parallel surfaces, said projections forming securing means for securing said pin to another article, and a second pair of axially extending wing portions on opposite sides of said center axis and generally perpendicular to said first pair of wing portions,
   wherein one wing portion of said second pair of wing portions has a substantially constant trapezoidal cross-section throughout a length thereof, wherein a side of said one wing portion remote from said center axis is narrower than a remainder of said one wing portion, wherein the other wing portion of said second pair of wing portions has a substantially rectangular cross-section whose height and width progressively decrease toward said free end.

5. A pin according to claim 4, wherein said another article has a clip attached thereto, said clip having opposing spaced elastic clip members, said pin being adapted to be clipped between said clip members of said clip with said securing means mating with said clip members.

6. A pin according to claim 5, wherein said pin is formed integrally with said one article.

7. A pin according to claim 4, wherein said one article is an instrument panel safety pad of an automobile and said clip is attached to a traversing reinforcement.

8. A pin according to claim 4 including at least one bolt means, said bolt means together with said pin connecting said one article to said another article.

9. A combination comprising a connecting pin being longitudinally parallelly extending opposite surfaces with opposite outward projections on said surfaces and a clip having opposing spaced elastic clip members, said pin being adapted to be clipped between said clip members of said clip with said projections mating with said clip members so that said pin can move in a direction transverse to the length of said pin wherein said clip has a wall defining an oblong recess for inserting said pin, said clip members consisting of a part of said wall at first opposite sides of said recess, said first sides being closer to one another than second opposite sides of said recess.

10. A combination according to claim 9, wherein said projections are so angled relative to said surfaces of said pin that said pin is detachable from said clip 11. A combination according to claim 9, wherein said pin is generally configured as a cross in section substantially throughout the length thereof.

* * * * *